Nov. 4, 1958
S. REIS
2,858,842
DEVICE FOR AUTOMATICALLY REGULATING
THE FLUID DELIVERY OF A PUMP
Filed Sept. 19, 1955
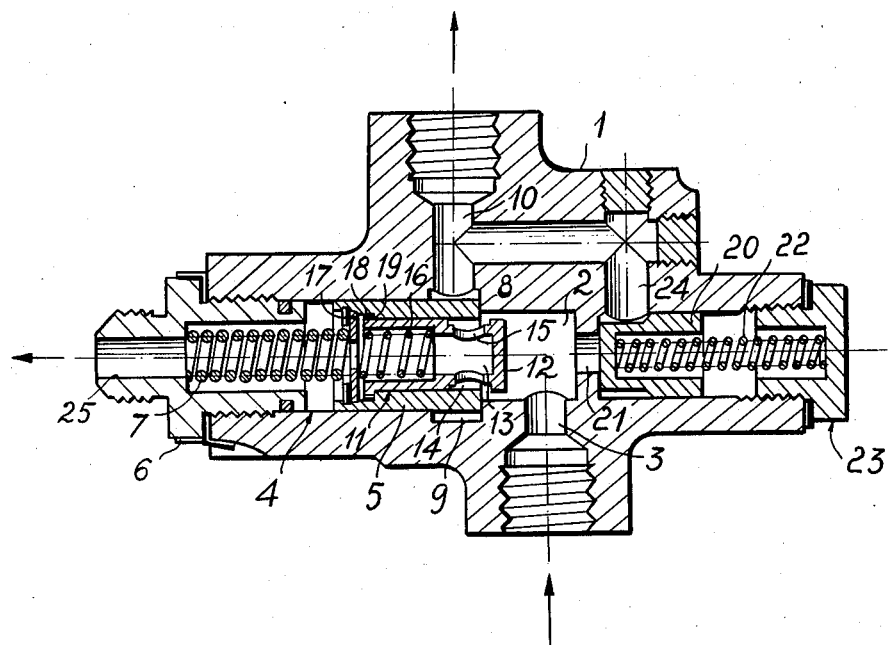
INVENTOR:
SMIL REIS
BY
AGENT

United States Patent Office 2,858,842
Patented Nov. 4, 1958

2,858,842

DEVICE FOR AUTOMATICALLY REGULATING THE FLUID DELIVERY OF A PUMP

Smil Reis, Milan, Italy

Application September 19, 1955, Serial No. 535,138

Claims priority, application Italy September 17, 1954

6 Claims. (Cl. 137—108)

The present invention relates to a device for automatically regulating the fluid delivery of a pump, which device is particularly suitable for use in connection with pumps for the fluid-pressure-operated servo-mechanisms of a vehicle.

Pumps designed to supply fluid under pressure to a servo-mechanism of a motor vehicle, such as the pump feeding a servo-steering mechanism of such vehicle, are driven by the vehicle engine at a speed of rotation varying proportionally to the speed of the vehicle itself. In such cases the fluid output of the pump also varies and at higher speeds the delivery of the pump may be excessive, thus causing undue hydraulic resistance and overheating, among other undesirable effects.

It is an object of the present invention to obviate such inconveniences, by providing a simple device adapted to regulate the output of a pump so as to maintain practically constant the rate of fluid delivery to a load at various speeds.

This and other objects of the present invention are attained by the provision of a fluid regulator which comprises a housing body with an inlet conduit and two outlet conduits for a fluid and valve means including two independently movable valve elements interposed between the inlet conduit and the outlet conduits, respectively. The first of said elements controls the communication of the inlet conduit with one of the outlet conduits and is able to cut off completely such communication, whereas the second element controls the passage between the inlet conduit and the other outlet conduit so as to restrict but never completely to block such passage. The regulator also comprises spring means urging the first valve element into closed position and the second valve element into wide-open position against the pressure of fluid from the inlet conduit; the size of the effective area of said valve means, adapted to be acted upon by the fluid, and the dimensioning of the spring means are so selected that one of said elements begins its movement before the other whenever a change in fluid pressure occurs.

Further objects and advantages of this invention will be made evident in the following disclosure and a full comprehension thereof may best be achieved by consideration of the accompanying drawing, which is for illustrative purposes only and whose sole figure shows a preferred embodiment of the invention in longitudinal section.

Referring more particularly to this drawing, the device comprises a housing body 1 having a chamber 2 in the interior and a cylindrical passage 4 forming an extension of chamber 2. A piston valve 5 is arranged to slide in said passage 4. An inlet port 3, in the wall of body 1, communicating with chamber 2, is joined to the delivery end of a pump (not shown in the drawing), and serves to introduce fluid under pressure into chamber 2. An adapter 6, traversed by a channel 25, is screwed into the end of passage 4 beyond valve 5. The adapter 6 is joined to a conduit for conveying the fluid from channel 25 to a servo-mechanism (not shown in the drawing) in which the pressure of said fluid is utilized. A spring 7, situated between adapter 6 and valve 5 forces the latter against a seat 8 in the interior of body 1 at the junction of chamber 2 and passage 4. The inner end of this passage is enlarged to form an annular recess 9 adjacent seat 8 and communicates with the exterior of housing 1 through a discharge port 10 connected to the suction end of the pump. Communication between the chamber 2 and the recess 9 is interrupted when valve 5 engages the seat 8. A cylindrical bore 11 is formed in valve 15 and a valve 12 is arranged to slide therein. In the embodiment described this latter valve consists of a tubular body with a closed end separating its interior 13 from chamber 2. Peripherally, an annular groove 14 is cut in the outer wall of valve 12. Holes 15 connect said groove 14 with the inner valve chamber 13. A circular shoulder 18 on the outer surface of valve 12 is situated between the two axially spaced stops 17 and 19 formed within valve 5. These stops limit the travel of valve 12 in both directions, in such way that groove 14 is always in communication with chamber 2. Thus, the distance between the right-hand edges (as viewed in the drawing) of groove 14 and of bore 11 determines the effective opening of the valve 12. This opening is a maximum when the shoulder 18 is abutting against stop 19 and is a minimum when said shoulder 18 is abutting against stop 17. A spring 16 inserted between stop 17 and valve 12 tends to keep said valve in its maximum opening position.

The device is completed by an exhaust-valve assembly of known construction including a valve member 20 urged by spring 22 against a port 21 leading to chamber 2, thus closing this port against a channel 24. A plug 23 supports the spring 22. Channel 24 communicates with port 10 and thus with the suction end of the pump when valve member 20 is driven outwardly by excessive pressure of the fluid in the device.

The device works as follows:

Fluid arriving from the pump (not shown in the drawing) enters housing chamber 2 and passes through groove 14, holes 15 and valve chamber 13 into the passage 4 beyond valves 5 and 12. From there, by means of channel 25, it reaches the servo-mechanism where it is utilized. If the pump is driven at its predetermined lower speed limit, pressure of the fluid is at a minimum and consequently springs 7 and 16 respectively keep valve 5 pressed against seat 8 and valve 12 with its shoulder 18 against stop 19. Thus, passage of fluid from chamber 2 to discharge port 10 is blocked, whilst the path from chamber 2 to the servo-mechanism is completely open through passages 14, 15, 13 and 25. If the pump speed increases, the rate of fluid flow into chamber 2 increases, and thus a higher pressure is exerted upon the closed right-hand end of valve 12. This increase in pressure forces valve 12 deeper into bore 11, against the action of spring 16, thus restricting the passage of fluid from housing chamber 2 to valve chamber 13. As a result, the chamber 2 builds up further and acts on valve 5 which, on opening, connects the chamber 2 with the recess 9 so that part of the circulating fluid returns to the pump intake end.

The displacement of valves 5 and 12 continues against the reaction of the respective springs 7 and 16, until an equilibrium is established between the pressure in the chamber 2 on the one side and the force of said springs 7 and 16 on the other side. With proper dimensioning of these springs, the rate of fluid flow through output channel 25 remains practically constant, in accordance with the general object of the invention.

If the servo-mechanism receiving the output of the device exerts a mounting reaction, the counter-pressure in passage 4 beyond valves 5 and 12 increases and aids springs 7 and 16 to displace these valves toward, respectively, seat 8 and stop 19. In this way the discharge through recess 9 and port 10 is restricted or blocked, and a portion of the pump output sufficient to match the increased load reaches the servo-mechanism.

If the pressure of the system rises above a predetermined upper limit, the safety valve 20 opens to discharge part of the output of the pump through channel 24 and port 10.

I claim:

1. A regulator for the rate of fluid flow from a source of fluid under pressure, comprising a housing having a chamber and an inlet port communicating with said chamber for admitting fluid thereto from said source, said housing further having a discharge port connected with said chamber via a first passage and an output port connected with said chamber via a second passage, a first and a second valve element in said first and said second passage respectively, said valve elements being movable independently of each other, spring means acting upon said valve elements against the pressure of said fluid in said chamber, said spring means urging said first valve element into a normal position blocking said first passage and urging said second valve element into a normal position maintaining said second passage wide open, said valve elements being responsive to increasing fluid pressure in said chamber for progressively opening said first passage and for progressively restricting said second passage, respectively, and stop means limiting the displacement of said second valve element from its normal position to an extent preventing complete blocking of said second passage, said second passage extending through said first valve element, said second valve element being displaceably carried on said first valve element, said stop means forming part of said first valve element.

2. A regulator according to claim 1, wherein said spring means comprises a first spring anchored to said first valve element and to said housing and a second spring anchored to both of said valve elements.

3. A regulator according to claim 2, wherein said second valve element has a major surface area exposed to the fluid in said chamber, the dimensioning of said springs and of said surface area being such as to cause a displacement of said second valve element from its normal position, in response to an increase in fluid pressure in said chamber, prior to a corresponding displacement of said first valve element.

4. A regulator according to claim 1, wherein said housing is provided with a third passage extending between said chamber and the exterior of the housing, further comprising spring-loaded safety valve means normally blocking said third passage and adapted to yield to excess fluid pressure in said chamber.

5. A regulator according to claim 4, wherein said third passage communicates with the exterior by way of said discharge port.

6. A regulator for the rate of fluid flow from a source of fluid under pressure, comprising a housing having a first chamber and an inlet port communicating with said first chamber for admitting fluid thereto from said source, said housing further having an output port and a cylindrical second chamber situated between and communicating with said first chamber and said output port, said housing further having a discharge port connected to said first chamber by means of said second chamber, a first valve element displaceable along the axis of said second chamber, first spring means urging said first valve element into a normal position blocking the fluid flow from said first chamber into said second chamber and thence into said discharge port, a second valve element telescoped within said first valve element, second spring means urging said second valve element into a normal position maintaining fluid flow from said first chamber into said second chamber and thence to said output port, said first and second valve elements being movable independently of each other and being responsive to increasing fluid pressure in said first chamber for progressively opening the passage from said first chamber to said second chamber and thence to said discharge port and for progressively restricting the flow to said output port, respectively, and stop means limiting the displacement of said second valve element from its normal position to an extent preventing complete blocking of the fluid flow.

References Cited in the file of this patent

UNITED STATES PATENTS

| | | |
|---|---|---|
| 2,395,941 | Rockwell | Mar. 5, 1946 |
| 2,647,530 | Jaquith | Aug. 4, 1953 |
| 2,696,828 | Husing | Dec. 14, 1954 |
| 2,737,196 | Eames | Mar. 6, 1956 |